United States Patent
Mujtaba et al.

(10) Patent No.: US 8,589,667 B2
(45) Date of Patent: Nov. 19, 2013

(54) BOOTING AND CONFIGURING A SUBSYSTEM SECURELY FROM NON-LOCAL STORAGE

(75) Inventors: Aon Mujtaba, Santa Clara, CA (US); Haining Zhang, San Jose, CA (US); Arjuna Sivasithambaresan, Santa Clara, CA (US); Alex Ho, San Jose, CA (US); Arun Mathias, Sunnyvale, CA (US); Stephen Schell, San Mateo, CA (US); Jonathan J. Andrews, San Jose, CA (US); Jason Gosnell, San Francisco, CA (US); Dallas B. De Atley, San Francisco, CA (US); Jerry Hauck, Windermere, FL (US)

(73) Assignee: Apple Inc., Cupertino, CA (US)

( * ) Notice: Subject to any disclaimer, the term of this patent is extended or adjusted under 35 U.S.C. 154(b) by 332 days.

(21) Appl. No.: 12/944,481

(22) Filed: Nov. 11, 2010

(65) Prior Publication Data
US 2011/0258426 A1  Oct. 20, 2011

Related U.S. Application Data

(60) Provisional application No. 61/325,777, filed on Apr. 19, 2010.

(51) Int. Cl.
*G06F 9/00* (2006.01)
(52) U.S. Cl.
USPC .................. 713/2; 713/1; 713/44; 713/168
(58) Field of Classification Search
USPC ............................................. 713/1
See application file for complete search history.

(56) References Cited

U.S. PATENT DOCUMENTS

| | | | |
|---|---|---|---|
| 6,049,854 A | 4/2000 | Bedarida | |
| 6,449,720 B1 | 9/2002 | Sprague et al. | |
| 7,107,044 B1 | 9/2006 | Zaidi et al. | |
| 7,290,080 B2 | 10/2007 | Patel | |
| 2005/0066067 A1 | 3/2005 | Suh | |
| 2007/0028120 A1 | 2/2007 | Wysocki et al. | |
| 2007/0033387 A1 | 2/2007 | Arnez et al. | |
| 2007/0192529 A1* | 8/2007 | Roh et al. ..................... | 711/100 |

(Continued)

OTHER PUBLICATIONS

Microchip Technology inc., Section 23. CodeGuard(tm) Security, 2007, Microchip Technology inc., p. 23.1.*

(Continued)

*Primary Examiner* — Paul Yanchus, III
*Assistant Examiner* — Austin Hicks
(74) *Attorney, Agent, or Firm* — Park, Vaughan, Fleming & Dowler LLP (57) ABSTRACT

According to one aspect, a multifunctional computing device having a wireless communications processor (e.g., cellular processor) and an application processor (e.g., general-purpose processor such as a CPU) share a storage device that is associated with or attached to the application processor. An example of such a multifunctional computing device may be a Smartphone device having a cellular phone and handheld computer functionalities. There is no specific storage device directly associated with or attached to the wireless communications processor (hereinafter simply referred to as a wireless processor). Instead, the wireless processor communicates with the application processor via a high speed communications link, such as a USB link, to access code and data stored in the storage device (e.g., flash memory device) associated with the application processor.

17 Claims, 9 Drawing Sheets

(56) References Cited

U.S. PATENT DOCUMENTS

| | | |
|---|---|---|
| 2007/0280483 A1 | 12/2007 | Fu et al. |
| 2008/0165952 A1* | 7/2008 | Smith et al. .................. 380/28 |
| 2008/0226073 A1 | 9/2008 | Hawkes et al. |
| 2008/0282022 A1 | 11/2008 | Gonikberg et al. |
| 2009/0257595 A1 | 10/2009 | De Cesare et al. |
| 2010/0023778 A1* | 1/2010 | Hauck et al. ................ 713/182 |
| 2010/0077130 A1 | 3/2010 | Kwon |

OTHER PUBLICATIONS

PCT International Search Report and Written Opinion of the International Searching Authority, PCT/US2011/032557 filed Apr. 14, 2011, mailed Jul. 8, 2011, 18 pages.

PCT International Preliminary Report on Patentability, PCT/US2011/032557 filed Apr. 14, 2011, mailed Nov. 1, 2012, 9 pages.

* cited by examiner

Fig. 9

BOOTING AND CONFIGURING A SUBSYSTEM SECURELY FROM NON-LOCAL STORAGE

RELATED APPLICATIONS

This application claims the benefit of U.S. Provisional Patent Application No. 61/325,777, entitled "Booting and Configuring a Subsystem from Non-Local Storage," filed Apr. 19, 2010, which is incorporated by reference in its entirety.

FIELD OF THE INVENTION

Embodiments of the invention relate generally to the field of data processing systems; and more particularly, to methods for booting and configuring a subsystem securely from non-local storage.

BACKGROUND

Multifunctional devices such as Smartphone devices are getting popular recently. Typically, a multifunctional device includes multiple processors having different functionalities. For example, a Smartphone device includes a general-purpose processor and a wireless communications processor. Each of these processors typically includes associated with it a non-volatile memory for storing any information or data associated with the respective processor, including initialization code image, etc. However, such a non-volatile memory may incur additional cost and cause a device to have a larger size.

SUMMARY OF THE DESCRIPTION

According to one aspect, a multifunctional computing device having a wireless communications processor (e.g., cellular processor) and an application processor (e.g., general-purpose processor such as a CPU) share a storage device that is associated with or attached to the application processor. An example of such a multifunctional computing device may be a Smartphone device having a cellular phone and handheld computer functionalities. There is no specific storage device directly associated with or attached to the wireless communications processor (hereinafter simply referred to as a wireless processor). Instead, the wireless processor communicates with the application processor via a high speed communications link, such as a universal serial bus-high speed inter-chip (USB-HSIC) link, to access code and data stored in the storage device (e.g., flash memory device) associated with the application processor.

According to another aspect, in response to a boot command, a read-only memory (ROM) boot loader is executed from a secure ROM of a wireless communications processor, where the ROM boot loader initializes hardware associated with wireless communications processor of the portable device. The ROM boot loader establishes a communication link with an application processor of the portable device over an internal bus that couples the wireless communications processor with the application processor. The ROM boot loader fetches a boot code image from a non-volatile storage device over the communication link, where the non-volatile storage device is associated with and accessed by the application processor via a first operating system (OS) executed within a first random-access memory (RAM) associated with the application processor. The ROM boot loader authenticates the boot code image, and upon having successfully authenticated the boot code image, the ROM boot loader launches the boot code mage into a second RAM associated with the wireless communications processor to establish a second OS for the wireless communications processor. As a result, by accessing the non-volatile storage device associated with the application processor via the communications link over the internal bus, the wireless communications processor does not have to maintain a separate non-volatile storage device.

According to further aspect, in response to a command to update a software component for a portable device, a session key is generated. The session key is encrypted using a storage key that is derived from a unique identifier (UID) uniquely identifying the portable device. A recovery blob is generated having embedded therein the session key encrypted by the storage key. In addition, the session key is also encrypted using a public key of a public/private key pair. Thereafter, the recovery blob and the session key encrypted by the public key are sent to an authorization server, where the authorization server is configured to recover the session key by decrypting the session key using a private key of the public/private key pair. Subsequently, in response to the software component and the recovery blob downloaded from a provisioning server, the session key is recovered from the recovery blob by decrypting the recovery blob using the storage key, where the software component is encrypted by the session key which is received by the provisioning server from the authorization server. Thereafter, the software component is recovered by decrypting encrypted software component using the session key that is recovered from the recovery blob, where the software component is to be installed in the portable device.

Other features of the present invention will be apparent from the accompanying drawings and from the detailed description which follows.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, a multifunctional computing device having a wireless communications processor (e.g., cellular processor) and an application processor (e.g., general-purpose processor such as a central processing unit or CPU) share a storage device (e.g., a non-volatile storage device) that is associated with or attached to the application processor. An example of such a multifunctional computing device may be a Smartphone device having a cellular phone and handheld computer functionalities. There is no specific storage device directly associated with or attached to the wireless communications processor (hereinafter simply referred to as a wireless processor). Instead, the wireless processor communicates with the application processor via a high speed communications link, such as a universal serial bus-high speed inter-chip (USB-HSIC) link, to access executable code and data stored in the storage device (e.g., flash memory device) associated with the application processor.

In one embodiment, when the wireless processor boots up, the wireless processor securely fetches wireless code image (e.g., executable code image) from the storage device of the application processor over the communications link; authenticates the boot code; and executes the boot code in a random access memory (RAM) associated with the wireless processor in order to establish an operating environment for the wireless processor. The wireless code image may include multiple segments and each of the segments may be signed by a chain of certificates. The root certificate may be stored in a secure read-only-memory (ROM) of the wireless communications processor, which can be used to authenticate the first overall code segment retrieved from the shared storage device.

Segments of the code image may be configured as a sequence of segments. A current segment of the code sequence may authenticate a next segment of the code sequence using the chain of certificates. For example, segments of the code may include a low level boot code, an intermediate level boot code, and a high level boot code. The low level boot code may be authenticated initially by the root certificate. Once the low level boot code has been authenticated or verified, the low level boot code may be launched or executed. Once the low level boot is running, the low level boot code may (fetch and) authenticate the intermediate level boot code, which in turn upon having been successfully authenticated and loaded by the low level coot code, may (fetch and) authenticate the high level boot code, and so on. If there is any segment of software components that cannot be successfully authenticated and executed, the device may be forced into a recovery mode (e.g., device firmware update or DFU mode), in which a new version of the software may be downloaded from a trusted server over a network.

In addition, the code image and/or data may be encrypted by a key derived from a unique identifier (UID) that uniquely identifies the wireless communications processor. That is, the code image and/or data may be personalized by encrypting the same using the key derived from the UID. The UID may also be stored in the secure ROM of the wireless communications processor. Alternatively, the UID may be hardwired (e.g., via burnt fuses) on the hardware associated with the wireless communications processor. As a result, each software component is authenticated and verified before being executed to guarantee that the software components have not been compromised.

During normal operations, whenever the wireless processor needs to read or store data, since there is no direct storage associated with the wireless processor, the wireless processor may access the storage device of the application processor via a communications link within the multifunctional computing device, similar to a remote file system, but on a device level rather than over a network. As a result, a conventional storage device specifically associated with or attached to the wireless processor can be removed. The cost and/or physical size of the device can be reduced.

In addition, according to one embodiment, specific data associated with the wireless processor, such as a wireless network ID (e.g., international equipment identity (IMEI) or mobile equipment identifier (MEID)) and radio frequency (RF) calibration data are also stored in the storage device of the application. As a result, the RF calibration data can be updated easily after the device has been released from the manufacturer, without having to return the device back to the manufacturer for updating the same data. The configuration and operation the device can be more flexible.

Figure 1:
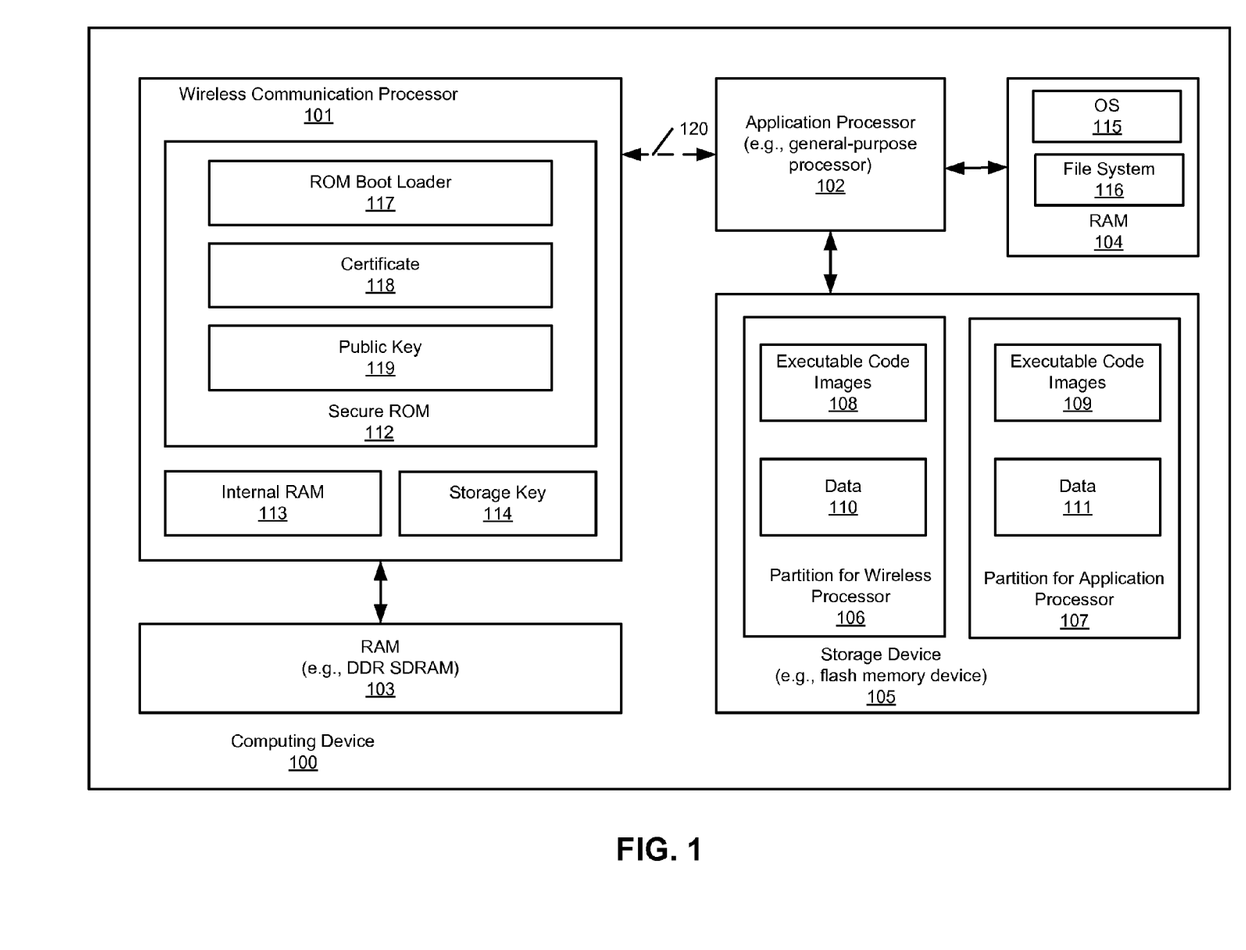
FIG. 1 is a block diagram illustrating a multifunctional computing device according to one embodiment of the invention.

FIG. 1 is a block diagram illustrating a multifunctional computing device according to one embodiment of the invention. For example, device 100 may represent a Smartphone such as an iPhone™ from Apple Inc. of Cupertino, Calif. Alternatively, device 100 may represent a tablet PC such as an iPad™ from Apple Inc. Referring to FIG. 1, in one embodiment, device 100 includes a wireless communications processor 101 and an application processor 102 communicatively coupled to each other via internal bus 120. Wireless processor 101 may be any kind of wireless processors, such as, for example, a cellular processor, a Wi-Fi processor, a Bluetooth processor, etc. Application processor 102 may be any kind of general-purpose processors.

In addition, device 100 further includes random access memory (RAM) 103 associated with wireless processor 101 and RAM 104 associated with application processor 102. RAM 103 is utilized by wireless processor 101 to execute any software components associated with the wireless processor 101, including boot code, an operating system (OS), and other runtime applications and/or data, etc. Similarly, RAM 104 is utilized by application processor 102 to execute any software components associated with the application processor 102, including OS 115 and file system (FS) 116 of application processor 102, as well as other applications and/or data.

Further, device 100 further includes a non-volatile storage device 105 that is associated with or attached to application processor 102. For example, storage device 105 may be a flash memory device such as a NOR or NAND flash memory device. Alternatively, storage device 105 may be a mass storage device such as a hard disk. In one embodiment, unlike conventional multifunctional devices, wireless processor 101 does not have a dedicated non-volatile storage device associated with it. In other embodiments, wireless processor may have a very small amount of non-volatile storage associated with it, such as secure ROM 112, for example, to bootstrap a secure boot process. In such embodiments, the small amount of non-volatile storage does not, however, have enough capacity to store a boot image or other software or data, e.g. configuration/calibration programs and data of the wireless processor. Rather, any code or data associated with wireless processor 101 may be stored in storage device 105. In one embodiment, wireless processor 101 can access content associated with wireless processor 101 in storage device 105 via a communications link over internal bus 120. In one embodiment, internal bus 120 may be a USB-HSIC compatible bus, where wireless processor 101 can access the associated content stored in storage device 105 using a high speed communications protocol, such as, for example, a streaming non-framing communications protocol. Alternatively, the internal bus 120 may be one of USB high speed (USB-HS), USB full speed (USB-FS), and universal asynchronous receiver/transmitter serial peripheral interface (UART SPI) compatible buses.

In one embodiment, although not required, storage device 105 may include separate partitions for wireless processor 101 and application processor 102. In this example, partition 106 is configured to store code images 108 and data 110 associated with wireless processor 101. Partition 107 is configured to store code images 109 and data 111 associated with application processor 102. As a result, a dedicated non-volatile storage device associated with wireless processor can be removed. Instead, wireless processor 101 can access its associated partition 106 via application processor 102 and/or its associated OS 115 and file system (FS) 116 over internal bus 120. In this embodiment, wireless processor 101 may not be able to directly access storage device 105. Instead, wireless processor 101 has to go through application processor 102, OS 115, and/or FS 116 via a communications link over internal bus 120.

Figure 2:
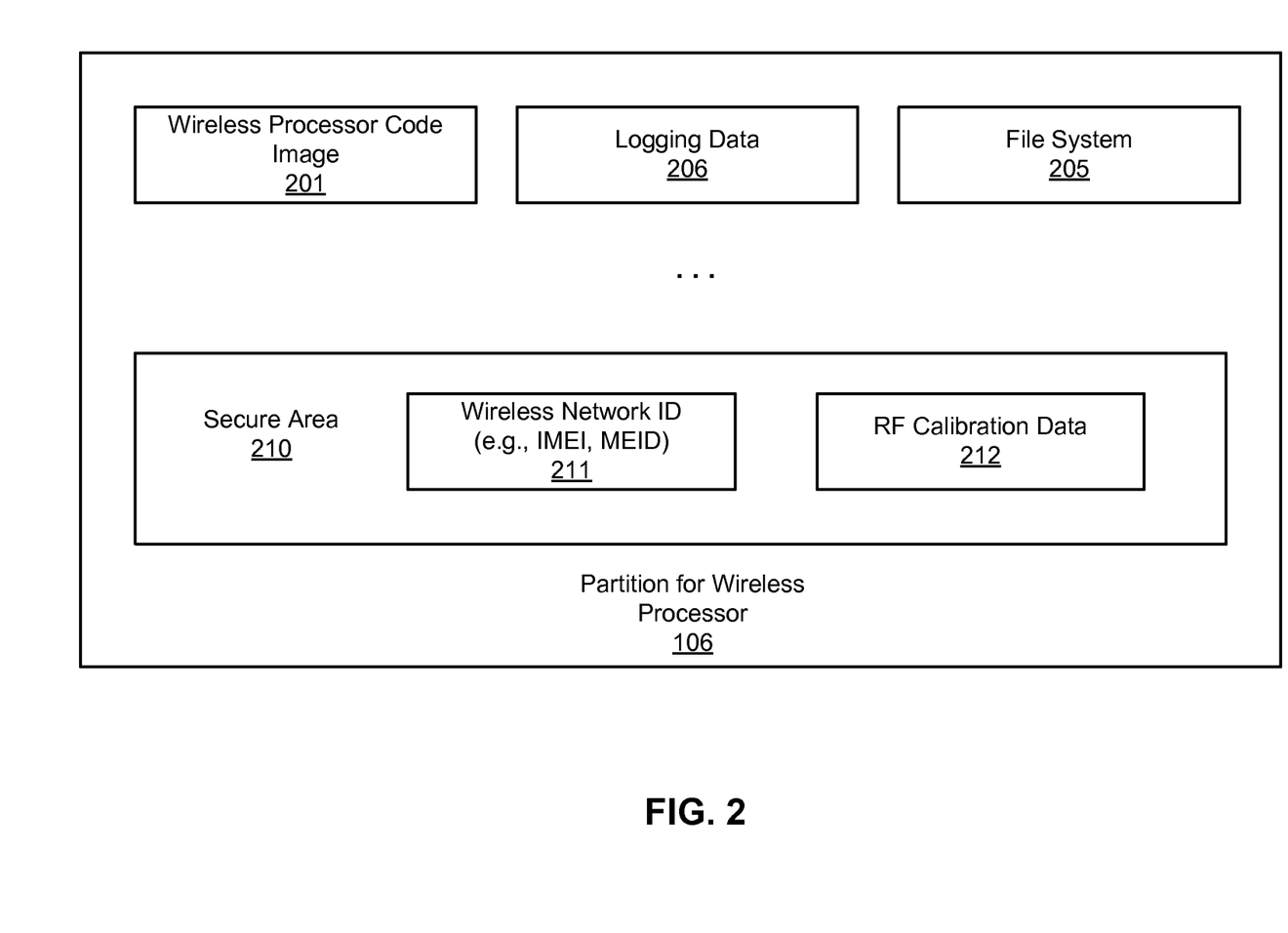
FIG. 2 is a block diagram illustrating a storage image for a wireless processor according to one embodiment.

An example of storage partition 106 associated with wireless processor 101 is shown in FIG. 2. Referring to FIG. 2, partition 106 can be used to store wireless processor code image 201, one or more copies of file system files 205, and other runtime data such as logging data 206. Wireless code image 201 may be authenticated and loaded by read-only memory boot loader (ROM BL) 117 of FIG. 1. In addition, partition 106 may include a secure or protected area 210 to store any wireless critical data, such as, for example, wireless network ID associated with the wireless processor (e.g., IMEI or MEID) and RF calibration data 212, etc. Wireless network ID 211 and RF calibration data 212 can be retained in the protected area 210 even during a recovery process in which some or all of data 201-206 may be erased.

Referring to FIG. 1, according to one embodiment, wireless processor 101 includes a secure read-only memory (ROM) 112 having stored therein ROM BL 117, certificate 118, and optional public key 119. Wireless processor 101 further includes an internal or on-chip RAM 113 and a storage key 114. Storage key 114 may be generated based on a unique ID (UID) that uniquely identifies wireless processor 101. Storage key 114 and/or the UID (not shown) may be hard-wired in the hardware (e.g., burnt fuses) during the manufacturing of wireless processor 101. Storage key 114 may be used to encrypt any content generated by wireless processor 101, such as, for example, runtime data (e.g., log data, messages received by wireless processor 101, etc.) Certificate 118 may be used to inspect or certify certain data that has been signed by a proper certificate. For example, certificate 118 may be a root certificate of a chain of certificates (e.g., X.509 compatible certificate chain). Public key 119 is a public key of a predetermined public/private key pair, where the corresponding private key is maintained by the proper authority or provisioning entity that provides data to wireless processor 101.

According to one embodiment, referring to FIGS. 1 and 2, when wireless processor 101 receives a command to boot, ROM BL 117 is executed from secure ROM 112. ROM BL 117 is configured to initialize certain hardware components of wireless processor 101, including internal RAM 113 and a communications link or channel over internal bus 120. Once internal RAM 113 and the communications link have been initialized, ROM BL 117 fetches wireless processor code image 201 from partition 106 of storage device 105 over the communications link. The wireless processor code image 201 is loaded into internal RAM 113 and/or external RAM 103.

Note that, throughout this application, wireless communications processor 101 may be referred in general herein as a chipset, an integrated circuit (IC), or an application-specific IC (ASIC), which may include one or more actual processors, processor cores, execution units, or functional units. The chipset or IC described herein includes secure ROM 112, internal RAM 113, and/or other components such as storage key 114, etc., according to some embodiments.

In addition, ROM BL 117 is configured to authenticate the wireless processor code image 201. In one embodiment, wireless processor code image 201 is signed by a certificate. ROM BL 117 is configured to authenticate wireless processor code image 201 using certificate 118. If wireless processor code image 201 cannot be successfully authenticated, at least wireless processor 101 may be forced into a DFU mode in which new data may be provisioned and downloaded from a trusted server. Once wireless processor code image 201 has been authenticated successfully, wireless processor code image 201 is launched by ROM BL 117 within RAM 113 and/or RAM 103 to establish an operating environment (e.g., OS and/or file system) for wireless processor 101.

The wireless code image 201 may include multiple segments and each of the segments may be signed by one of a chain of certificates. Certificate 118 may be used to authenticate the first overall code segment retrieved from the shared storage device. In one embodiment, segments of the code image may be configured as a sequence of segments. A current segment of the code sequence may authenticate a next segment of the code sequence using the chain of certificates. For example, segments of the code may include a low level boot code, an intermediate level boot code, and a high level boot code. The low level boot code may be authenticated first by the root certificate. Once the low level boot code has been authenticated or verified, the low level boot code may be launched or executed. Once the low level boot is running, the low level boot code may (fetch and) authenticate the intermediate level boot code, which in turn upon having been successfully authenticated and loaded by the low level boot code, may (fetch and) authenticate the high level boot code, and so on. If there is any segment of software components that cannot be successfully authenticated and executed, the device may be forced into a DFU mode, in which a new version of the software may be downloaded from a trusted server.

In one embodiment, internal RAM 113 has a storage size that is smaller than the storage size of external RAM 103. In one particular embodiment, during the initialization, ROM boot loader 117 fetches a first code segment (e.g., the first overall code segment) from storage device 105, authenticates the first code segment (e.g., using certificate 118), and launches the first code segment within internal RAM 113. The first code segment, when successfully authenticated and executed from internal RAM 113, fetches a second code segment (e.g., the next code segment in a sequence of code segments), authenticates the second code segment (e.g., using a chain of certificates associated with certificate 118), and launches the second code segment in external RAM 103.

In addition, according to one embodiment, the code image and/or data may be encrypted by a key derived from a UID that uniquely identifies the wireless communications processor. That is, the code image and/or data may be personalized by encrypting the same using a key derived from the UID. As a result, only the software components that are specifically designed or provisioned for the device can be allowed to be installed on the device. The UID may also be stored in the secure ROM of the wireless communications processor. Alternatively, the UID may be hardwired (e.g., via burnt fuses) on the hardware associated with the wireless communications processor. As a result, each software component is authenticated and recovered before being executed to guarantee that the software components have not been compromised.

Further detailed information concerning the authentication and booting of software components in order to establish an operating environment for a processor can be found in co-pending U.S. patent application Ser. No. 11/620,689, entitled "Secure Booting A Computing Device," filed Jan. 7, 2007, which is incorporated by reference herein in its entirety.

In addition, some of the code images and/or data may be packaged according to a predetermined format and can be authenticated via a common security model. For example, some of the code images and/or data may be packaged similar to an Image3 format. In such an implementation, each of the software components to be installed and loaded in the system is implemented or packaged as an object having a predetermined format such that a single security processing engine (e.g., code builder and/or code loader) can be used to build and verify each of the objects as a mechanism to determine whether each software component is trusted and compatible with certain limitations or criteria of system before executing the executable code embedded within the respective object. At least a portion of each object, such as a payload of the object, may be encrypted by a key that is derived from the UID of the device (e.g., licked or personalized), in which only the targeted device can decrypt the object.

Further detailed information concerning the Image3 format and/or the common security model can be found in co-pending U.S. patent application Ser. No. 12/103,685, entitled "Single Security Model in Booting a Computing Device," filed Apr. 15, 2008, which is incorporated by reference herein in its entirety.

Figure 3:
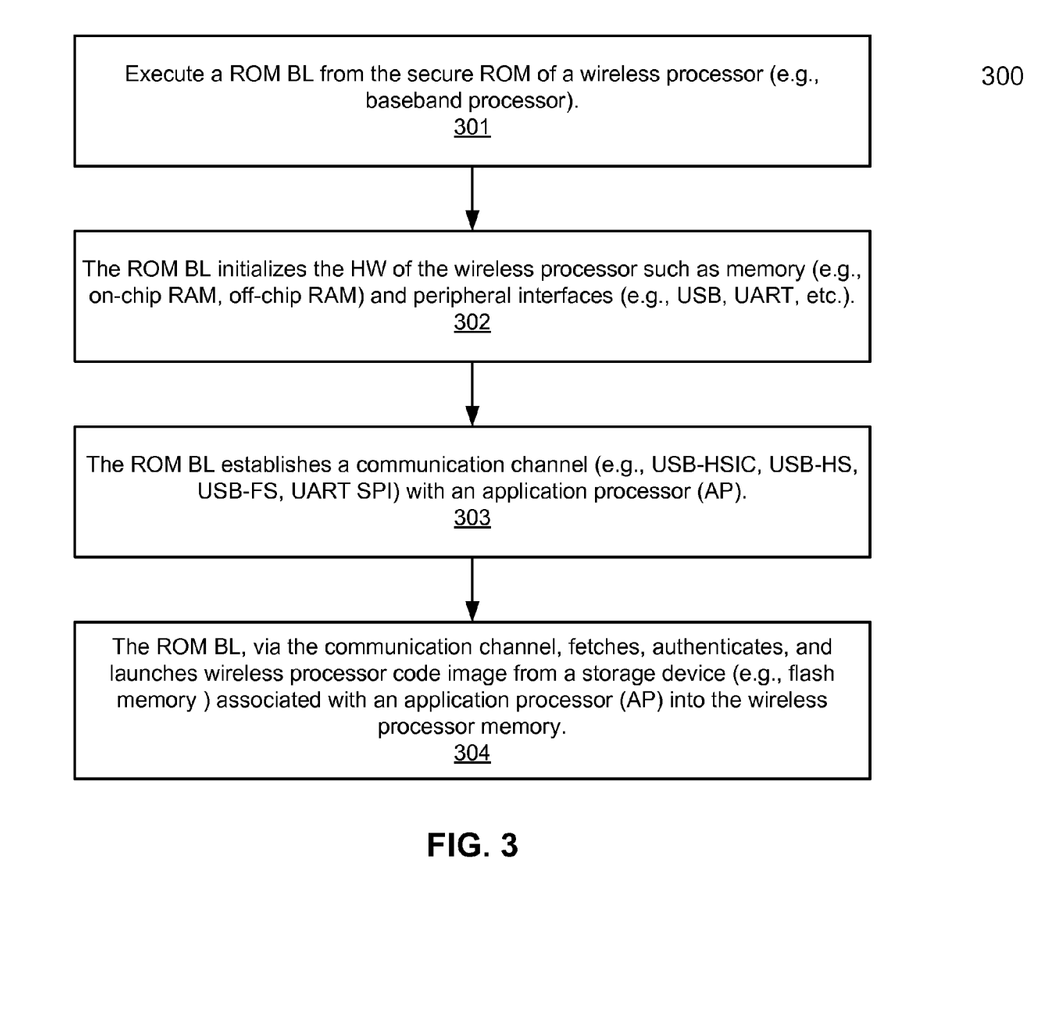
FIG. 3 is a flow diagram illustrating a method for booting a wireless communications processor according to one embodiment of the invention.

FIG. 3 is a flow diagram illustrating a method for booting a wireless communications processor according to one embodiment of the invention. For example, method 300 may be performed by system 100 of FIG. 1. Referring to FIG. 3, in response to a boot command, at block 301, a ROM BL is executed from a secure ROM of a wireless processor. At block 302, the ROM BL initializes certain hardware of the wireless processor, including the internal RAM and external RAM. At block 303, the ROM BL establishes a communications channel (e.g., USB-HSIC, USB-HS, USB-FS, or UART SPI) with the application processor. In one embodiment, it is assumed that when the wireless processor is booting up, the application processor has already rooted up and running. At block 304, the ROM BL fetches, authenticates, and launches the wireless processor code image from a storage device associated with the application processor via the communications link over the internal bus to establish an operating environment for the wireless processor. In one embodiment, the wireless processor code image may be configured or partitioned into a sequence of code segments. Each of the code segments can be fetched, authenticated, and loaded in sequence. A previous code segment in the sequence may fetch, authenticate, and launch a next code segment of the sequence. If there are any of the segments that fail to be authenticated or executed, at least the wireless processor may be forced into a DFU mode.

Figure 4:
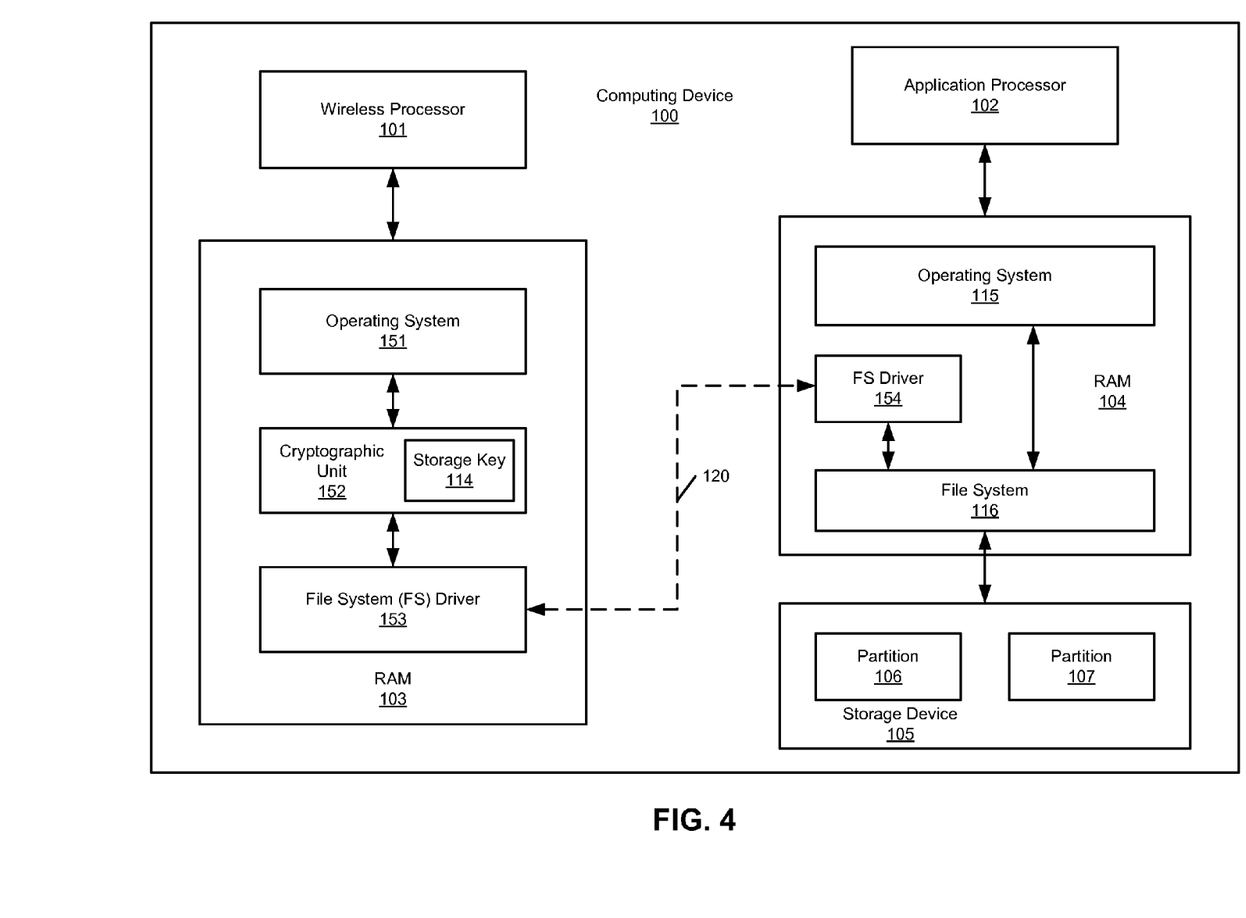
FIG. 4 is a block diagram illustrating a multifunctional computing device according to another embodiment of the invention.

FIG. 4 is a block diagram illustrating a multifunctional computing device according to another embodiment of the invention. In this example, device 400 represents device 100 of FIG. 1 that has been successfully booted up using at least some of the techniques described above. Referring to FIG. 4, once wireless processor 101 has booted up successfully, operating system 151 is up and running, where OS 151 is established based on at least the wireless processor code image authenticated and installed using the techniques described above. In addition, a cryptographic unit 152 is configured to encrypt any runtime data that will be stored in storage partition 106 of storage device 105 using storage key 114. The runtime generated data may include any over-the-air provisioning data received by wireless processor over a wireless network and/or user specific or confidential data (e.g., emails or messages such as SMS messages, logging, and/or file system related files), etc.

Since there is no local or dedicated non-volatile memory device associated with wireless processor 101, a file system (FS) driver 153 is utilized as a file system proxy driver or daemon. In one embodiment, for any data generated from processor 101 and/or OS 151 to be written to storage device 105, cryptographic unit 152 is configured to encrypt the data using storage key 114 and pass the encrypted data to FS driver 153. FS driver 153 in turn transmits the encrypted data to FS driver 154 located at the application processor side over a communications link (e.g., USB-HSIC). FS driver 154 invokes a service of file system 116 to store the encrypted data in the corresponding partition 106 of storage device 105.

Similarly, when processor 101 and/or OS 151 need to retrieve data from storage device 105, processor 101 and/or OS 151 may send a read command to FS driver 153. FS driver 153 relays the read command to FS 154 to retrieve the associated data (e.g., encrypted data) from storage device 105 via FS 116. Once the encrypted data is received by FS driver 153, cryptographic unit 152 is configured to decrypt the encrypted data using storage key 114 and pass the decrypted data up to processor 101 and/or OS 151. Thus, FS driver 153 may serve as a proxy or agent similar to one in remote file systems. Alternatively, FS driver 153 may serve as a virtual file system to OS 151, where OS 151 may not know that the content actually is stored in storage device 105 of application processor 102.

Note that in some situations, only the critical or sensitive data may be encrypted. Other data such as logging data may not be encrypted. In this way, the efficiency of accessing the shared storage can be improved. Also note that it may not need to maintain separate partitions for wireless processor 101 and application processor 102. Single partition may also be implemented as long as certain critical or confidential data is maintained in a secured manner which may not be accessible by application processor 102.

As described above, in a conventional device, RF calibration data is generated by manufacturers and maintained in a local storage device of the wireless processor. In addition, in order to update the RF calibration data, conventionally, the device has to be returned to the manufacturer, which will store the new RF calibration data in the associated non-volatile storage device. In one embodiment, since there is no local non-volatile storage device associated with the wireless processor, the RF calibration data is stored in storage device 105 of application processor 102. Since the RF calibration data has to be maintained even if the device crashed, the RF calibration data may be stored in a protected or secured area of the storage device, as shown in FIG. 2.

In one embodiment, the RF calibration data may also be stored in a server (e.g., an authorized distributed server or provisioning server) of a cloud network and instead of returning the device back to the manufacturer, the RF calibration data may be updated by downloading the new RF calibration data from the cloud network and stored in storage device 105 associated with application processor 102. The RF calibration data may be specifically provisioned and associated with wireless processor 101 by encrypting the RF calibration data using a UID or storage key 114 of wireless processor 101, such that only wireless processor 101 can recover the RF calibration data by decrypting the encrypted RF calibration data. As a result, the RF calibration data can be easily updated on the field after the device left the manufacturer, which is more flexible than a conventional configuration requiring the device to be returned to the manufacturer for updating the RF calibration data.

Figure 5:
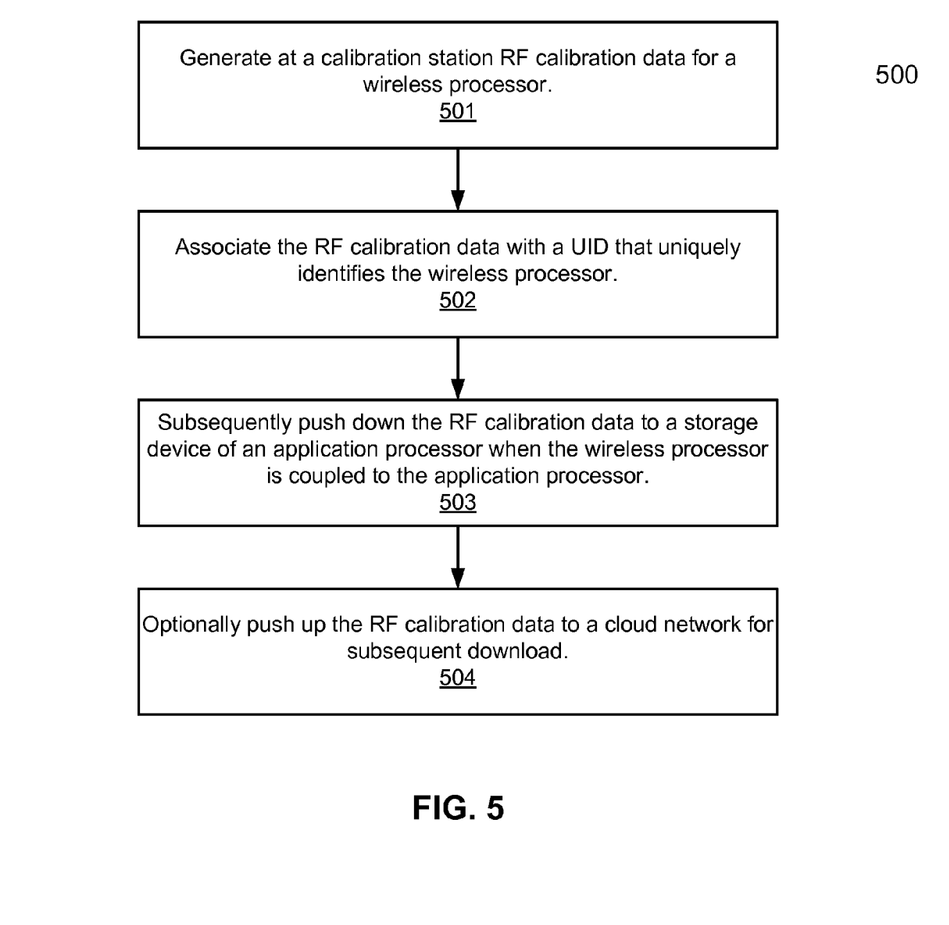
FIG. 5 is a flow diagram illustrating a method for generating RF calibration data according to one embodiment of the invention.

FIG. 5 is a flow diagram illustrating a method for generating RF calibration data according to one embodiment of the invention. For example, method 500 may be performed in a calibration station. Referring to FIG. 5, at block 501, RF calibration data is generated at a calibration station for a particular wireless processor. At block 502, the RF calibration data is associated with a UID that uniquely identifies the wireless processor. For example, the RF calibration data may be encrypted by a key generated based on the UID of the wireless processor. The encrypted RF calibration data may be retained by the manufacturer or calibration station temporarily. Subsequently, at block 503, the RF calibration data may be pushed down to a storage device of an application processor when the wireless processor is coupled to the application processor. Note that in some situations, the wireless processor and the application processor may be manufactured by different vendors at different time. Since there is no local storage device associated with the wireless processor, the RF calibration data may need to be retained by the manufacturer until the application processor and its associated storage device are available (e.g., integrated). Optionally, at block 504, the encrypted RF calibration data may be pushed up in a cloud network for subsequent download (e.g., if the local copy of RF calibration data is corrupted or outdated).

Figure 6:
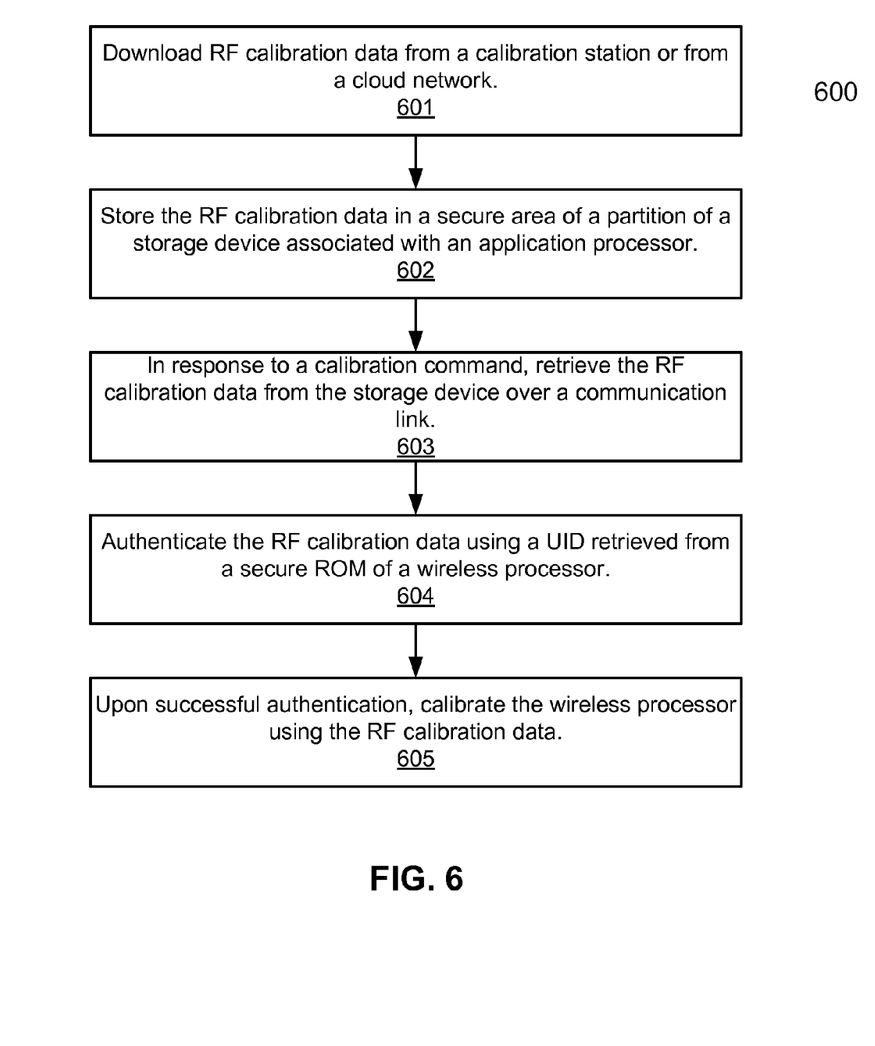
FIG. 6 is a flow diagram illustrating a method for updating RF calibration data according to one embodiment of the invention.

FIG. 6 is a flow diagram illustrating a method for updating RF calibration data according to one embodiment of the invention. For example, method 600 may be performed by a wireless processor to update new RF calibration data on the field after the device has been released from the manufacturer. At block 601, RF calibration data is downloaded from a calibration station or from a cloud network, where the RF calibration data may be encrypted by a key derived from a UID of a wireless processor. At block 602, the RF calibration data is stored in a storage device of an application processor. In response to a calibration command, at block 603, the RF calibration data is retrieved from the storage device over a communications link. At block 604, the wireless processor authenticates the RF calibration data by decrypting the RF calibration data using a locally maintained key derived from a UID of the wireless processor (e.g., storage key 114 of FIG. 1). Upon successful authentication and/or decryption, at block 605, the wireless processor is calibrated using the RF calibration data.

When new data such as provisioning data or RF calibration data is downloaded from a remote facility (e.g., distribution or provisioning server), in order to maintain the security of the new data, the data has to be encrypted by the provisioning facility that only the proper recipient (e.g., proper wireless processor) can decrypt the data. That is, the key used to encrypt the data can only be known to the intended recipient and the provisioning facility; otherwise, the data may be compromised.

Figure 7:
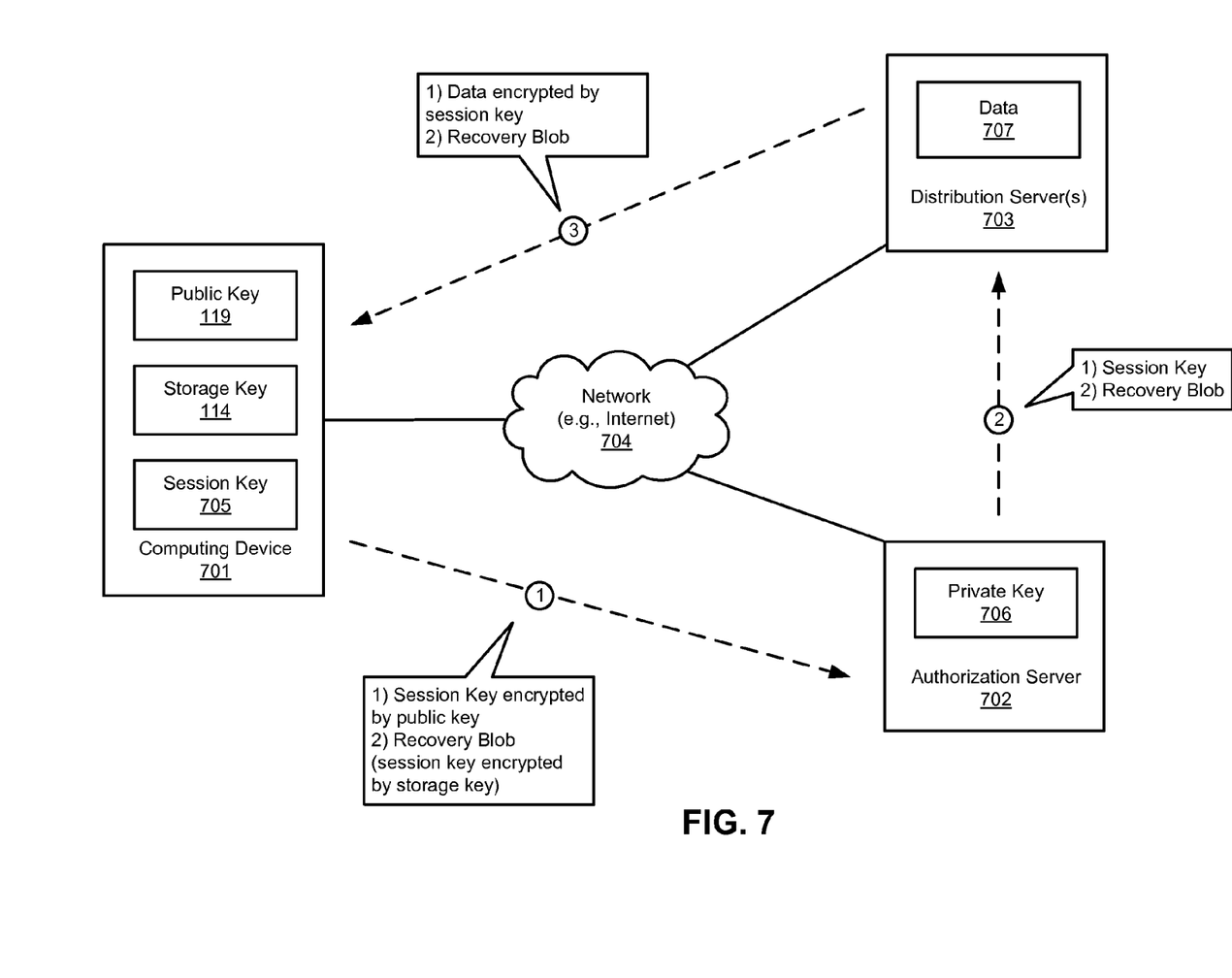
FIG. 7 is a diagram illustrating a system configuration for provisioning a computing device according to one embodiment of the invention.

FIG. 7 is a diagram illustrating a system configuration for securely downloading data from a remote facility over a network to be installed at a wireless processor according to one embodiment of the invention. Referring to FIG. 7, system configuration 700 includes a computing device 701, authorization server 702, and one or more distribution servers 703 communicatively coupled to each other over network 704, which may be a local area network or a wide area network (e.g., Internet). Computing device 701 may represent computing device 100 of FIG. 1. Authorization server 702 may be associated with an authority that designs or manufactures computing device 701. Distribution server 703 may be any of the servers in network 704 (e.g., cloud network) that are authorized to distribute data 707, such as provisioning data or RF calibration data, to be installed or used by computing device 701.

According to one embodiment, if there is a need for computing device 701 to download data from one of the distribution servers such as server 703, computing device 701 generates a temporary or random session key 705. Session key 705 is then encrypted by public key 119, a public component of a public/private key pair, where the private component of the key pair is maintained by authorization server 702 as private key 706. Public key 119 may be distributed previously in a form of a digital certificate, for example, during the manufacturing of the device. In addition, a recovery blob is generated by encrypting session key 705 using storage key 114 or a key that is derived from the UID of computing device 701. Thereafter, the encrypted session key and the recovery blob are sent from computing device 701 to authorization server 702 via path (1). Authorization server 702 authenticates computing device 701 and recovers the session key by decrypting the session key using private key 706. The session key and the recovery blob are sent from authorization server 702 to one of the distribution servers 703 via path (2), for example, via a secured connection. Distribution server 703 then encrypts data 707 using the session key received from authorization server 702. Thereafter, the encrypted data 707 and the recovery blob are sent from distribution server 703 back to computing device 701.

Computing device 701 can recover the session key by decrypting the recover blob using storage key 114. The session key can then be used to decrypt the encrypted data 707 for installation or calibration, etc. That is, if computing device 701 is the intended recipient of the encrypted data 707, computing device 701 should be able to recover the session key by decrypting the recovery blob using storage key 114, since the recovery blob was originally generated by the true owner, in this example, computing device 701. Any other device that did not generate the recovery blob cannot recover the session key since it does not possess the proper storage key to decrypt the recovery blob. As a result, data 707 distributed by server 703 can be securely downloaded and installed at computing device 701. Note that private key 706 may also be distributed to and maintained by distribution server 703. Also note that authorization server 702 and distribution server 703 may be the same server.

Furthermore, according to one embodiment, data 707 may be packaged and distributed using a ticket-based authorization process for secure installation. In this embodiment, data 707 may be specifically packaged and personalized via a "ticket." A ticket represents a collection of security measures such as hashes and/or version identifiers for each of the software components. A ticket may be generated and distributed by a central authority such as authorization server 702. A ticket may reduce the chances that a hacker can mix and match different versions of the software components for installation. Further detailed information concerning the ticket-based authorization process can be found in co-pending U.S. patent application Ser. No. 12/329,377, entitled "Ticket Authorized Secure Installation and Boot," filed Dec. 5, 2008, which is incorporated by reference herein in its entirety.

Figure 8:
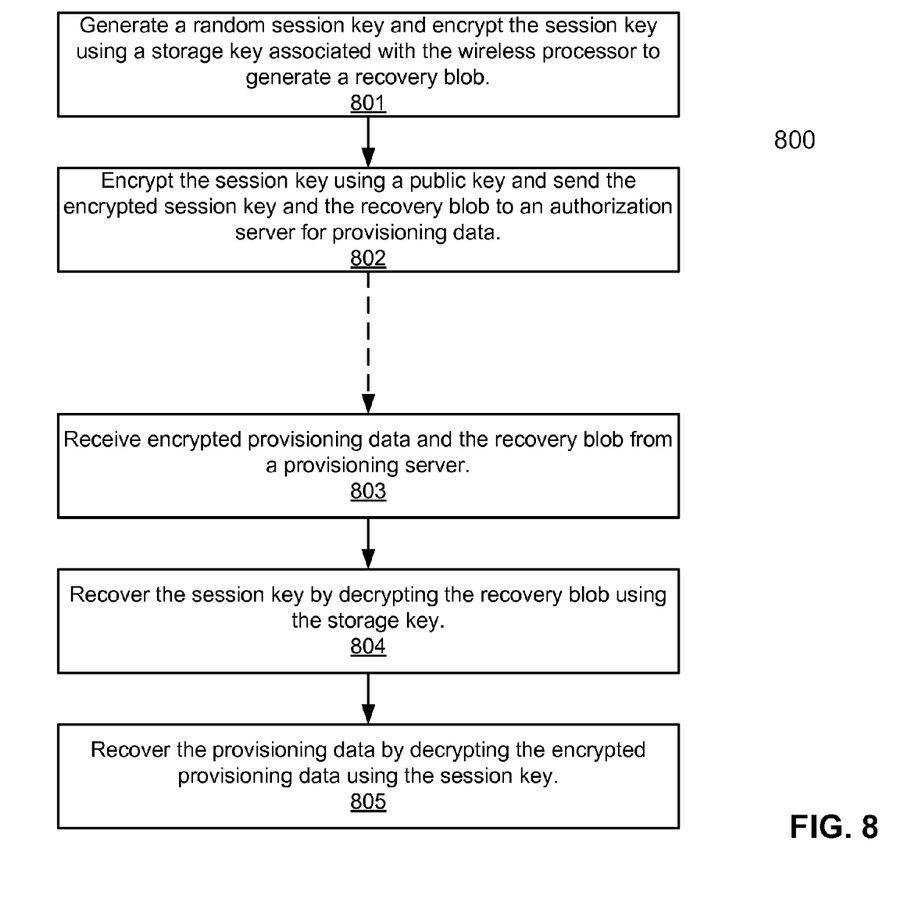
FIG. 8 is a flow diagram illustrating a method for update provisioning data according to one embodiment of the invention.

FIG. 8 is a flow diagram illustrating a method for update provisioning data according to one embodiment of the invention. Method 800 may be performed by a wireless processor such as wireless processor 101, particularly, during a DFU mode in an attempt to download new set of data. Referring to FIG. 8, when there is a need to update new data from a remote server, at block 801, a session key is generated. The session key is encrypted by a key derived from a UID of the wireless processor (e.g., storage key 114 of FIG. 1), which generates a recovery blob. At block 802, the session key is also encrypted by a public key (e.g., public key 119 of FIG. 1) of an asymmetric key pair having a public key and a private key. Both the recovery blob and the session encrypted by the public key are sent to a trusted authorization server (e.g., apple.com).

In this embodiment, it is assumed that the public key was generated during manufacturing of the device, where the private key of the key pair is retained by the trusted authorization facility (e.g., authorization server). The trusted authorization facility may recover the session key by decrypting the encrypted session key using the corresponding private key. The trusted authorization facility may then send both the recover blob and the session key to one or more of the distribution facilities in the cloud network.

Subsequently, at block 803, the distributed data encrypted by the session key by a distribution facility, as well as, the recovery blob, is received by the wireless processor. In this situation only the proper or intended recipient would have the necessary key (e.g., storage key) to decrypt the recovery blob. At block 804, the wireless processor may recover the session key by decrypting the recovery blob using the key that is derived from the UID of the device. At block 805, the session key is then used to decrypt the distributed data sent from the distribution facility. That is, only both the distribution facility and the device would have the proper session key which can be used to exchange further secrets.

Figure 9:
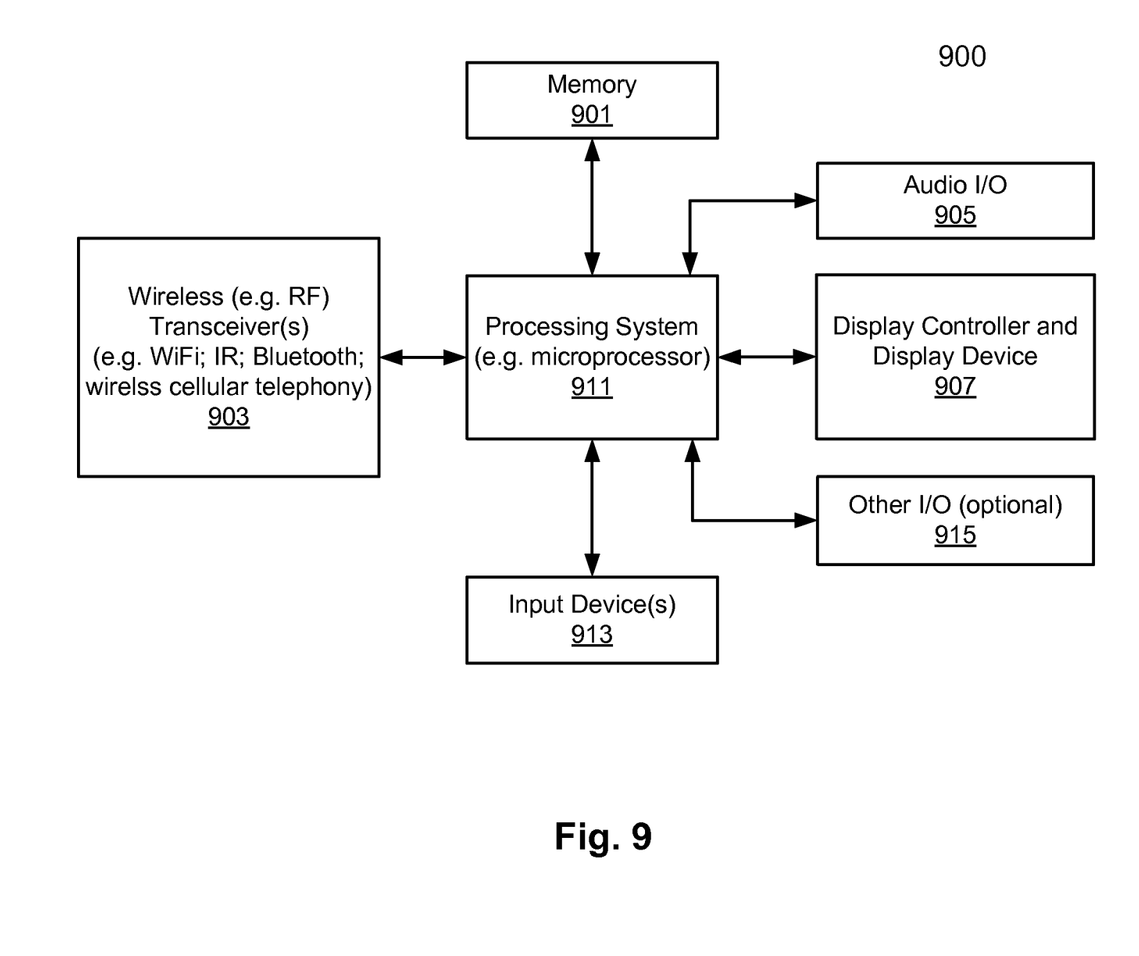
FIG. 9 shows an example of a data processing system which may be used with one embodiment of the present invention.

FIG. 9 shows an example of a data processing system which may be used with one embodiment of the present invention. For example, system 900 may be implemented as device 100 as shown in FIG. 1. The data processing system 900 shown in FIG. 9 includes a processing system 911, which may be one or more microprocessors, or which may be a system on a chip of integrated circuit, and the system also includes memory 901 for storing data and programs for execution by the processing system. The system 900 also includes an audio input/output subsystem 905 which may include a microphone and a speaker for, for example, playing back music or providing telephone functionality through the speaker and microphone.

A display controller and display device 907 provide a visual user interface for the user; this digital interface may include a graphical user interface which is similar to that shown on an iPhone® phone device, an iPad device, or on a Macintosh computer when running operating system software. The system 900 also includes one or more wireless transceivers 903 to communicate with another data processing system. A wireless transceiver may be a WiFi transceiver, an infrared transceiver, a Bluetooth transceiver, and/or a wireless cellular telephony transceiver. It will be appreciated that additional components, not shown, may also be part of the system 900 in certain embodiments, and in certain embodiments fewer components than shown in FIG. 9 may also be used in a data processing system.

The data processing system 900 also includes one or more input devices 913 which are provided to allow a user to provide input to the system. These input devices may be a keypad, a keyboard, a touch panel, or a multi touch panel. The data processing system 900 also includes an optional input/output device 915 which may be a connector for a dock. It will be appreciated that one or more buses, not shown, may be used to interconnect the various components as is well known in the art. The data processing system shown in FIG. 9 may be a handheld computer or a personal digital assistant (PDA), or a cellular telephone with PDA like functionality, or a handheld computer which includes a cellular telephone, or a media player, such as an iPod, or devices which combine aspects or functions of these devices, such as a media player combined with a PDA and a cellular telephone in one device. In other embodiments, the data processing system 900 may be a network computer or an embedded processing device within another device, or other types of data processing systems which have fewer components or perhaps more components than that shown in FIG. 9.

At least certain embodiments of the inventions may be part of a digital media player, such as a portable music and/or video media player, which may include a media processing system to present the media, a storage device to store the media and may further include a radio frequency (RF) transceiver (e.g., an RF transceiver for a cellular telephone) coupled with an antenna system and the media processing system. In certain embodiments, media stored on a remote storage device may be transmitted to the media player through the RF transceiver. The media may be, for example, one or more of music or other audio, still pictures, or motion pictures.

The portable media player may include a media selection device, such as a click wheel input device on an iPod®, or iPod Nano® media player from Apple Inc. of Cupertino, Calif., a touch screen or multi-touch input device, pushbutton device, movable pointing input device or other input device. The media selection device may be used to select the media stored on the storage device and/or a remote storage device. The portable media player may, in at least certain embodiments, include a display device which is coupled to the media processing system to display titles or other indicators of media being selected through the input device and being presented, either through a speaker or earphone(s), or on the display device, or on both display device and a speaker or earphone(s).

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), etc.

The processes or methods depicted in the preceding figures may be performed by processing logic that comprises hardware (e.g. circuitry, dedicated logic, etc.), software, or a combination of both. Although the processes or methods are described above in terms of some sequential operations, it should be appreciated that some of the operations described may be performed in a different order. Moreover, some operations may be performed in parallel rather than sequentially.

The algorithms and displays presented herein are not inherently related to any particular computer or other apparatus. Various general-purpose systems may be used with programs in accordance with the teachings herein, or it may prove convenient to construct more specialized apparatus to perform the required method operations. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A portable device, comprising:
an application processor;
a first random access memory (RAM) coupled to the application processor, the first RAM having executed therein a first operating system (OS) that provides an operating environment for the application processor;
a non-volatile storage device coupled to the application processor and the first RAM, the non-volatile storage device storing data accessed by the application processor via the first OS;
a wireless communications processor coupled to the application processor over an internal bus;
a second RAM coupled to the wireless communications processor, the second RAM having executed therein a second OS that provides an operating environment for the wireless communications processor,
wherein the wireless communications processor is configured to access the non-volatile storage device via a communications link over the internal bus to fetch a boot code image from the non-volatile storage device to boot the wireless communications processor, to establish the second OS, and to access data associated with the wireless communications processor in the non-volatile storage device during normal operations,
wherein the boot code image includes a first boot code segment and a second boot code segment that are signed by a chain of digital certificates, wherein the ROM boot loader is configured to authenticate the first boot code segment using a first of the digital certificates in the chain and to execute the first boot code segment, and wherein the first boot code segment, when executed by the ROM boot loader, is configured to fetch the second boot code segment from the non-volatile storage device, to authenticate the second boot code segment using a second of the digital certificates in the chain, and to load the second boot code segment, and
wherein the second RAM includes a cryptographic unit executed therein, and wherein in response to a command for accessing the non-volatile storage device, the cryptographic unit is configured to encrypt and decrypt data to and from the non-volatile storage device over the communications link, using a storage key that is derived from a unique identifier (UID) that uniquely identifies the wireless communications processor.

2. The device of claim 1, wherein the wireless communications processor further comprises a secure read-only memory (ROM) for storing a ROM boot loader, wherein in response to a boot command received by the wireless communications processor, the ROM boot loader is executed from the secure ROM to initialize hardware of the wireless communications processor and to establish the communications link with the application processor over the internal bus.

3. The device of claim 2, wherein the ROM boot loader is configured to authenticate the boot code image, and upon having successfully authenticated the boot code image, to execute the boot code image in the second RAM to establish the second OS for the wireless communications processor.

4. The device of claim 3, wherein the ROM boot loader is configured to decrypt the boot code image using a storage key derived from a unique identifier (UID) that uniquely identifies the wireless communications processor.

5. The device of claim 3, wherein the ROM boot loader authenticates the boot code image using a digital certificate that is stored within the secure ROM of the wireless communications processor.

6. The device of claim 1, wherein the wireless communications processor further comprises an internal RAM initialized by the ROM boot loader, wherein the first code segment is fetched, authenticated, and launched within the internal RAM by the ROM boot loader, and wherein the second code segment is fetched, authenticated, and launched within the second RAM by the first boot code segment.

7. The device of claim 1, wherein the first RAM further includes a file system and a first file system driver executed therein, wherein the second RAM further includes a second file system driver executed therein, wherein the second file system driver is configured to communicate with the first file system driver over the communications link to invoke a file system service from the file system for the purpose of accessing the non-volatile storage device by the wireless communications processor.

8. A portable device, comprising:
an application processor;
a first random access memory (RAM) coupled to the application processor, the first RAM having executed therein a first operating system (OS) that provides an operating environment for the application processor;
a non-volatile storage device coupled to the application processor and the first RAM, the non-volatile storage device storing data accessed by the application processor via the first OS;
a wireless communications processor coupled to the application processor over an internal bus;
a second RAM coupled to the wireless communications processor, the second RAM having executed therein a second OS that provides an operating environment for the wireless communications processor,
wherein the wireless communications processor is configured to access the non-volatile storage device via a communications link over the internal bus to fetch a boot code image from the non-volatile storage device to boot the wireless communications processor, to establish the second OS, and to access data associated with the wireless communications processor in the non-volatile storage device during normal operations,
wherein the boot code image includes a first boot code segment and a second boot code segment that are signed by a chain of digital certificates, wherein the ROM boot loader is configured to authenticate the first boot code segment using a first of the digital certificates in the chain and to execute the first boot code segment, and wherein the first boot code segment, when executed by the ROM boot loader, is configured to fetch the second boot code segment from the non-volatile storage device, to authenticate the second boot code segment using a second of the digital certificates in the chain, and to load the second boot code segment, and
wherein in response to a command to update data, a session key is generated and encrypted by a storage key that is derived from a unique identifier (UID) uniquely identifying the wireless communications processor to generate a recovery blob, wherein the recovery blob and the session key encrypted by a public key are transmitted to an authorization server, and wherein in response to data and a recovery blob received from a provisioning server, the session key is recovered from the recovery blob by decrypting the recovery blob using the storage key, wherein the recovered session key is used to decrypt the data received from the provisioning server.

9. The device of claim 8, wherein the data includes radio frequency (RF) calibration data.

10. A machine-implemented method for operating a portable device, the method comprising:
in response to a boot command, executing a read-only memory (ROM) boot loader from a secure ROM of a wireless communications processor, wherein the ROM boot loader initializes hardware associated with wireless communications processor of the portable device;
establishing, by the ROM boot loader, a communication link with an application processor of the portable device over an internal bus that couples the wireless communications processor with the application processor;
fetching, by the ROM boot loader, a boot code image from a non-volatile storage device over the communication link, wherein the non-volatile storage device is associated with and accessed by the application processor via a first operating system (OS) executed within a first random-access memory (RAM) associated with the application processor;
authenticating, by the ROM boot loader, the boot code image;
upon having successfully authenticated the boot code image, the ROM boot loader launching the boot code image into a second RAM associated with the wireless communications processor to establish a second OS for the wireless communications processor,
wherein the boot code image includes a first boot code segment and a second boot code segment that are signed by a chain of digital certificates, wherein the ROM boot loader is configured to authenticate the first boot code segment using a first of the digital certificates in the chain from the secure ROM and to execute the first boot code segment, and wherein the first boot code segment, when executed by the ROM boot loader, is configured to fetch the second boot code segment from the non-volatile storage device, to authenticate the second boot code segment using a second of the digital certificates in the chain, and to load the second boot code segment,
wherein the boot code image is authenticated by the ROM boot loader using a digital certificate stored in the secure ROM, wherein the digital certificate is derived from a unique identifier (UID) that uniquely identifies the wireless communications processor; and
in response to a command for accessing the non-volatile storage device, encrypting and decrypting data to and from the non-volatile storage device over the communications link, using the storage key.

11. The method of claim 10, wherein authenticating the boot code image comprises decrypting at least a portion of the boot code image using a storage key derived from the UID of the wireless communications processor.

12. The method of claim 10, wherein the first RAM further includes a file system and a first file system driver executed therein, wherein the second RAM further includes a second file system driver executed therein, wherein the second file system driver is configured to communicate with the first file system driver over the communications link to invoke a file system service from the file system for the purpose of accessing the non-volatile storage device by the wireless communications processor.

13. A machine-implemented method for operating a portable device, the method comprising:
in response to a boot command, executing a read-only memory (ROM) boot loader from a secure ROM of a wireless communications processor, wherein the ROM boot loader initializes hardware associated with wireless communications processor of the portable device;
establishing, by the ROM boot loader, a communication link with an application processor of the portable device over an internal bus that couples the wireless communications processor with the application processor;
fetching, by the ROM boot loader, a boot code image from a non-volatile storage device over the communication link, wherein the non-volatile storage device is associated with and accessed by the application processor via a first operating system (OS) executed within a first random-access memory (RAM) associated with the application processor;

authenticating, by the ROM boot loader, the boot code image;

upon having successfully authenticated the boot code image, the ROM boot loader launching the boot code image into a second RAM associated with the wireless communications processor to establish a second OS for the wireless communications processor, wherein the boot code image includes a first boot code segment and a second boot code segment that are signed by a chain of digital certificates, wherein the ROM boot loader is configured to authenticate the first boot code segment using a first of the digital certificates in the chain from the secure ROM and to execute the first boot code segment, and wherein the first boot code segment, when executed by the ROM boot loader, is configured to fetch the second boot code segment from the non-volatile storage device, to authenticate the second boot code segment using a second of the digital certificates in the chain, and to load the second boot code segment;

in response to a command to update data, generating a session key;

encrypting the session key using a storage key that is derived from a unique identifier (UID) uniquely identifying the wireless communications processor;

generating a recovery blob having embedded therein the session key encrypted by the storage key;

encrypting the session key using a public key of a public/private key pair;

transmitting the recovery blob and the session key encrypted by the public key to an authorization server, wherein the authorization server is configured to recover the session key by decrypting the session key using a private key of the public/private key pair;

in response to data encrypted by the session key and a recovery blob downloaded from a provisioning server, recovering the session key from the recovery blob by decrypting the recovery blob using the storage key;

recovering the data by decrypting encrypted data using the session key; and storing the data in the non-volatile storage device.

14. A non-transitory machine-readable storage medium having instructions stored therein, which when executed by a machine, cause the machine to perform a method for operating a portable device, the method comprising:

in response to a boot command, executing a read-only memory (ROM) boot loader from a secure ROM of a wireless communications processor, wherein the ROM boot loader initializes hardware associated with wireless communications processor of the portable device;

establishing, by the ROM boot loader, a communication link with an application processor of the portable device over an internal bus that couples the wireless communications processor with the application processor;

fetching, by the ROM boot loader, a boot code image from a non-volatile storage device over the communication link, wherein the non-volatile storage device is associated with and accessed by the application processor via a first operating system (OS) executed within a first random-access memory (RAM) associated with the application processor;

authenticating, by the ROM boot loader, the boot code image; and upon having successfully authenticated the boot code image, the ROM boot loader launching the boot code image into a second RAM associated with the wireless communications processor to establish a second OS for the wireless communications processor, wherein the boot code image includes a first boot code segment and a second boot code segment that are signed by a chain of digital certificates, wherein the ROM boot loader is configured to authenticate the first boot code segment using a first of the digital certificates in the chain from the secure ROM and to execute the first boot code segment, and wherein the first boot code segment, when executed by the ROM boot loader, is configured to fetch the second boot code segment from the non-volatile storage device, to authenticate the second boot code segment using a second of the digital certificates in the chain, and to load the second boot code segment, wherein the boot code image is authenticated by the ROM boot loader using a digital certificate stored in the secure ROM, wherein the digital certificate is derived from a unique identifier (UID) that uniquely identifies the wireless communications processor; and in response to a command for accessing the non-volatile storage device, encrypting and decrypting data to and from the non-volatile storage device over the communications link, using the storage key.

15. The non-transitory machine-readable storage medium of claim 14, wherein authenticating the boot code image comprises decrypting at least a portion of the boot code image using a storage key derived from the UID of the wireless communications processor.

16. A machine-implemented method for operating a portable device, the method comprising:

in response to a command to update a software component for the portable device, generating a session key;

encrypting the session key using a storage key that is derived from a unique identifier (UID) uniquely identifying the portable device;

generating a recovery blob having embedded therein the session key encrypted by the storage key;

encrypting the session key using a public key of a public/private key pair;

transmitting the recovery blob and the session key encrypted by the public key to an authorization server, wherein the authorization server is configured to recover the session key by decrypting the session key using a private key of the public/private key pair;

in response to a software component and a recovery blob downloaded from a provisioning server, recovering the session key from the recovery blob by decrypting the recovery blob using the storage key, wherein the software component is encrypted by the session key which is received by the provisioning server from the authorization server; and recovering the software component by decrypting encrypted software component using a session key that is recovered from the recovery blob, wherein the software component is to be installed in the portable device.

17. The method of claim 16, wherein the software component includes at least one of a boot code image for booting the portable device and radio frequency (RF) calibration data for calibrating a wireless communications processor of the portable device.

* * * * *